(12) United States Patent
Alidina et al.

(10) Patent No.: US 6,175,912 B1
(45) Date of Patent: *Jan. 16, 2001

(54) ACCUMULATOR READ PORT ARBITRATION LOGIC

(75) Inventors: Mazhar M. Alidina, Allentown, PA (US); Bin Fu, Santa Clara, CA (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/970,723

(22) Filed: Nov. 14, 1997

(51) Int. Cl.[7] ....................................... G06F 9/302
(52) U.S. Cl. ........................... 712/222; 708/631; 708/632
(58) Field of Search .............................. 712/35, 221, 222, 712/225, 223; 708/490, 505, 603, 626, 631, 632

(56) References Cited

U.S. PATENT DOCUMENTS

| | | | |
|---|---|---|---|
| 4,075,692 | * | 2/1978 | Sorenson et al. ................... 711/149 |
| 4,323,964 | * | 4/1982 | Gruner ................................ 712/211 |
| 5,005,150 | * | 4/1991 | Dent et al. .......................... 708/521 |
| 5,784,306 | * | 7/1998 | Ogletree ............................. 708/603 |

OTHER PUBLICATIONS

T.K.M. Agerwala, "Accumulator–Based Vector Instructions", *IBM Technical Disclosure Bulletin*, vol. 24, No. 5, pp. 2483–2489, Oct. 1981.*

* cited by examiner

*Primary Examiner*—William M. Treat
(74) *Attorney, Agent, or Firm*—Synnestvedt & Lechner LLP

(57) ABSTRACT

A processor architecture having an accumulator register file with multiple shared read and/or write ports. Depending on the instruction, each port can be used to communicate with a different data source or destination.

17 Claims, 2 Drawing Sheets

ACCUMULATOR READ PORT ARBITRATION LOGIC

FIELD OF THE INVENTION

The invention pertains to the architecture of processors. More particularly, the invention pertains to communication data paths between an accumulator and other data processing and storage units in a digital signal processor.

BACKGROUND OF THE INVENTION

Digital signal processors (DSPs) include an accumulator for temporarily storing data generated by the one or more data processing units in the DSP. Commonly, the accumulator comprises multiple storage locations for simultaneously storing multiple, separate, pieces of data. Such an accumulator might be comprised of a register file. Sometimes each separate storage location in a processor core is termed an accumulator and thus, under this terminology, the processing core comprises many separate accumulators. In this specification, all temporary storage locations in a processor core are collectively termed an accumulator and each individually accessible storage location is termed an accumulator register.

The data processing units in the DSP, for example, may comprise one or more of each of an arithmetic logic unit (ALU), a bit manipulation unit (BMU), a multiply and accumulate unit (MAC), an adder, etc. Instructions in the instruction set of a DSP commonly call for the value generated at the output of one or more of the data processing units to be stored to one of the registers in the accumulator. Another instruction may call for data stored in one or more of the accumulator registers to be read out to the input of one or more of the data processing units to be used in the generation of further data by the data processing unit. Even further, instructions may call for data stored in one or more accumulator registers to be read out to memory via a data bus. A single instruction may even include a combination of two or more of any of the aforementioned operations. In order for the use of multiple data processing units in a DSP to be efficient, the accumulator must have multiple read ports and multiple write ports so that the multiple pieces of data needed to execute an instruction and/or the multiple pieces of data generated as a result of the execution of an instruction can all be written to and/or read from the accumulator during the execution of the instruction.

From a chip area perspective, read and write ports for an accumulator consume large amounts of chip area. Accordingly, an increase in the number of accumulator read and/or write ports in a DSP significantly increases the required size of the DSP data path. Further, as the number of read or write ports of an accumulator increases, the access time for the accumulator also increases. Thus, as the number of accumulator read and write ports increases, a slower and slower clock speed must be used, since the read access time will be in a timing critical path in virtually all practical DSPs.

Depending on the complexity of the DSP and the instruction set, a single instruction may call for the writing of multiple pieces of data to different registers in the accumulator as well as the reading out of the data from multiple registers in the accumulator to different destinations, such as an input of one of the data processing unit or memory.

Accordingly, it is an object of the present invention to reduce the number of read ports of an accumulator in a processor without any loss in functionality.

It is another object of the present invention to provide an improved digital signal processor.

It is another object of the present invention to provide a faster digital signal processor.

It is a further object of the present invention to provide a smaller digital signal processor without loss in functionality.

It is yet another object of the present invention to provide a less expensive digital signal processor without loss in functionality.

SUMMARY OF THE INVENTION

The invention is a processor, preferably a digital signal processor, having a multi-port accumulator register file having read and/or write ports that are shared among a plurality of data destinations and/or sources, respectively. The accumulator register file has multiple write ports and multiple read ports. One or more of the read ports is coupled to an input of one or more of the data processing units in the DSP as well as to another data destination, e.g., a data bus. Thus, each such shared read port may alternately be used to read data from an accumulator register to an input of one of the data processing units or to the bus. The bus may be coupled to memory or any other data destination. The write ports are coupled to receive data from various data processing units, such as an ALU and a BMU, and may be shared among the data processing units and a data bus or other data source in the same manner as described above with respect to the read ports.

An instruction sub-decoder receives each instruction (or a subset of the bits in the instruction) and decodes them to generate control lines for operating the accumulator to select which accumulator register is coupled with which read or write port during the execution of that instruction in accordance with the necessary read and/or write operations for that instruction.

By sharing the accumulator read and write ports, the number of necessary read and write ports to accommodate direct communication between the accumulator and the multiple various data sources and destinations is reduced. For instance, a given read port can be used during certain instructions to read data from an accumulator register to an input of a data processing unit in the DSP core, while during another instruction, the same read port can be used to read data out to memory (via the bus, for example).

In this manner, a separate port need not be dedicated to every particular data source or destination. Rather, one or more of the read ports can be coupled to multiple data destinations and one or more of the write ports can be coupled to multiple data sources. The ports are configurable on the fly and different instructions can utilize each port to communicate with a data destination or source different from the data destination or source that another instruction uses that port to communicate with.

DETAILED DESCRIPTION OF A PREFERRED EMBODIMENT OF THE INVENTION

Figure 1:
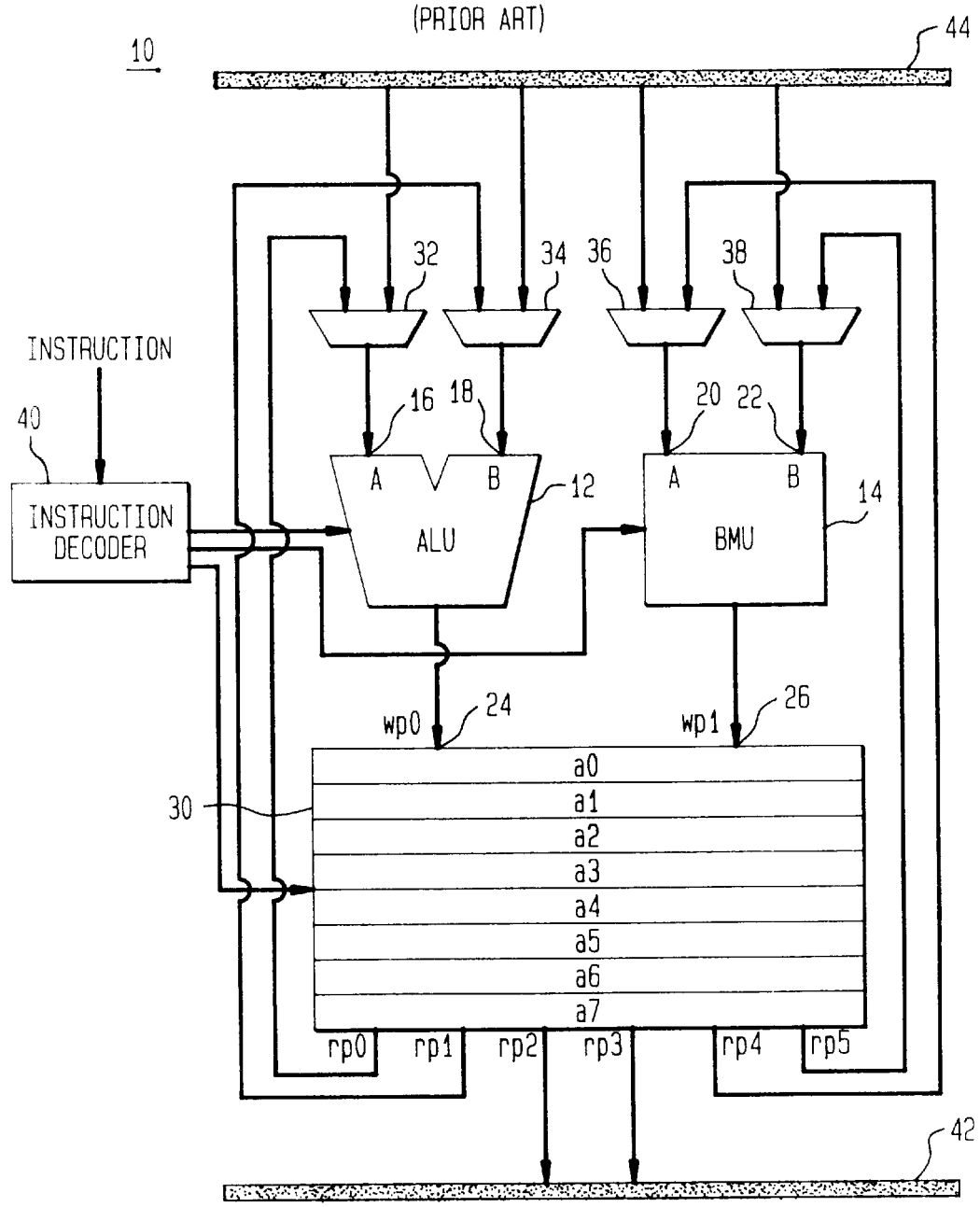
FIG. 1 is a simplified block diagram of a digital signal processor of the prior art.

FIG. 1 shows the processing core 10 of an exemplary digital signal processor of the prior art. This particular processor has two data processing units, namely, an arithmetic logic unit (ALU) 12 and a bit manipulation unit (BMU) 14. ALU 12, for instance, performs combinational functions, such as add, subtract, minimum, maximum, AND, OR, EXCLUSIVE-OR, etc. on the data placed at its input terminals 16 and 18. Bit manipulation unit 14, for example, performs bit shifting operations on the data presented at its inputs 20 and 22. The outputs 24 and 26 of the ALU and BMU 24 and 26, respectively, are coupled to the first and second write ports wp0 and wp1 of accumulator 30, respectively. The accumulator 30 comprises multiple storage locations a0 through a7, for selectively storing the data placed at its write ports.

The particular register to which the data is written is dictated by the instruction being executed. The accumulator 30 has multiple outputs, in this case six, rp0 through rp5. As shown in FIG. 1, rp0 is coupled to one input of multiplexer 32, rp1 is coupled to one input of multiplexer 34, rp2 and rp3 are each coupled to a data bus 42, rp4 is coupled to one input of multiplexer 36 and RP5 is coupled to one input of multiplexer 38.

Each of multiplexers 32, 34, 36 and 38 is also controlled by the particular instruction being executed to select the data on one of its inputs. In the illustrated example, one input of each multiplexer is coupled to receive data from the accumulator register file and the other input of each multiplexer is coupled to receive data from another source, such as a data bus 44 (shown) or a preceding data processing unit (not shown), such as a multiplier.

Each instruction dictates the particular register or registers in the accumulator which are to be written to and/or read from for that particular instruction.

As can be seen from the diagram, each read port, rp0 through rp5, has a unique destination. That is, for instance, if data in the accumulator is to be placed at the A input of ALU 12, it must be read out on port rp0. Likewise, data intended for memory or any other destination coupled to the bus must go out from read port rp2 or rp3. Therefore, in order to provide the functionality of simultaneously reading two accumulator registers out to the ALU, the BMU and/or the bus, the accumulator register file must have six read ports.

Figure 2:
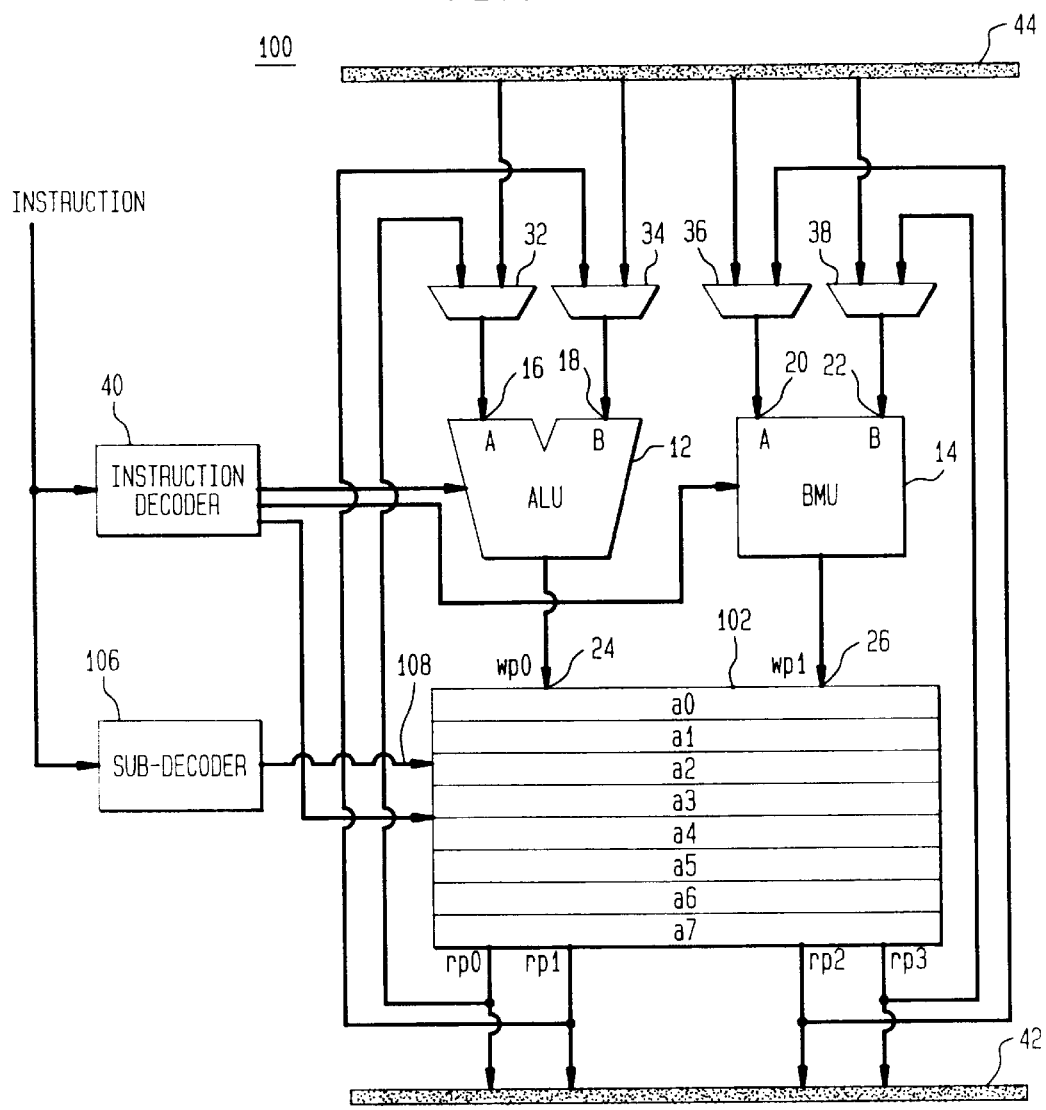
FIG. 2 is a simplified block diagram of a digital signal processor in accordance with the present invention.

FIG. 2 is a simplified block diagram of a similar data processing core 100 for a DSP, but embodying the present invention. As can be seen, most of the components are essentially identical to that discussed above in connection with FIG. 1. Elements which are essentially identical to the corresponding elements in FIG. 1 are given the same reference numeral in FIG. 2. The ALU 12, BMU 14, instruction decoder 40, and data bus 42 are unchanged. Accumulator 102 has the same general structure, comprising a plurality of registers a0 through a7. However, this accumulator has only four read ports, rp0 through rp3. rp0 is coupled to the A input of multiplexer 32, rp1 is coupled to the A input of multiplexer 34, rp2 is coupled to the A input of multiplexer 36 and rp3 is coupled to the A input of multiplexer 38. Each of read ports rp0–rp3 are also coupled to the data bus 42. A sub-decoder 106 decodes the instruction or a portion of the instruction from which it can be determined which read ports of the accumulator are needed to feed back data into one of the data processing units 12 and 14. Whatever read ports are not needed for feeding back data to data processing units 12 and 14, are available for reading data out to the bus 42. Accordingly, the control outputs 108 of sub-decoder 106 control the accumulator by dictating the read port or ports to which the data, if any, is to be written to memory (or any other destination coupled to the bus) as part of the execution of that instruction.

The following examples illustrate the operation of the present invention. One instruction in the instruction set for the DSP might perform the operation shown below:

$$a0=\min(a1, a0).\qquad\text{(Instruction 1)}$$

This instruction determines which of accumulator registers a1 and a0 is holding a smaller value and writes the lower value to accumulator register a0. Another instruction might perform the following operation:

$$a1=a4>>a5h.\qquad\text{(Instruction 2)}$$

This instruction tells the BMU to shift the value from accumulator register a4 with the value in the high half of accumulator register a5 and write the result to accumulator register a1.

In the exemplary DSP 100, the two operations above can be combined with simultaneous stores of data in the accumulator to memory, via the bus 42. Thus, for instance, another instruction in the instruction set might be:

$$a0=\min(a1, a0) *r0=a4.\qquad\text{(Instruction 3)}$$

This instruction informs the processing core to determine the smaller of the values stored in accumulator registers a1 and a0 and store the result to a0 while simultaneously writing the contents of accumulator register a4 to the memory location pointed to by pointer r0.

Another exemplary instruction is:

$$a1=a4>>5h *r1=a2\_a3h.\qquad\text{(Instruction 4)}$$

This instruction instructs the processing core to shift a4 with the value in the high half of a5 and write the result to a1 as previously described while simultaneously combining the high halves of a2 and a3 and writing the value thus created to the memory location pointed to by pointer r1.

It can be seen from FIG. 2 that, in connection with instruction 3 above, read ports rp0 and rp1 must be used to carry out the a0=min (a1, a0) portion of the instruction. This will leave read ports rp2 or rp3 available for the reading out of a4 to the bus 42. In instruction 4, on the other hand, it can be seen that read ports rp2 and rp3 must be used in connection with the execution of the a1=a4>>a5h portion of the instruction. This will leave read ports rp0 or rp1 available for writing a2_a3h to memory via bus 42.

Sub-decoder 106 decodes each instruction to determine which of read ports rp0–rp3 are available for bus reads for each instruction. The sub-decoder will determine the available ports for each instruction. However, whether the instruction uses the available ports for bus reads is an independent matter which will depend on the instruction.

The table below illustrates an exemplary set of control signals on lines 108 in accordance with the present invention.

| Control Signal | Description |
|---|---|
| rp0 | when 0:rp0 is NOT available for bus reads |
| | when 1:rp0 is available for bus reads |
| rp1 | when 00:rp1 is NOT available for bus reads |
| | when 01:rp1 is available for bus reads |
| | when 10:rp1 is available for second accumulator (pair case) |

| Control Signal | Description |
| --- | --- |
| rp2 | when 00:rp2 is NOT available for bus reads |
|  | when 01:rp2 is available for bus reads |
|  | when 10:rp2 is available for second accumulator (pair case) |
| rp3 | when 00:rp3 is NOT available for bus reads |
|  | when 01:rp3 is available for bus reads |
|  | when 10:rp3 is available for second accumulator (pair case) |

In this example, control lines 108 has seven bits, comprising two control bits corresponding to each read port, except for one of the read ports, which requires only one control bit. As can be seen from the table, there are three relevant conditions for each read port, namely, (1) it is not available for reading data out to the bus, (2) it is available for reading data out to the bus, or (3) it is available for the second operand (in the case of instructions utilizing two accumulator register operands). In this exemplary embodiment, "00" indicates that the port is not available for bus reads, "01" indicates that the port is available for bus reads, and "10" indicates that the port is available for reading a second operand to the bus 42.

One of the read ports requires only two conditions and, therefore, only one control line. In this example, read port rp0 is arbitrarily selected. The reason for this is that, for every instruction needing two operands from the accumulator, the instruction sets rp0 as the accumulator output port for the first operand. Accordingly, there is no need for the control line condition indicating that it is available for a second operand since, given the above, use of read port rp0 for the second accumulator operand is not possible.

The invention is readily adaptable to an accumulator with any number of read ports and/or data destinations. Further, the concept can be readily extended to accumulator write ports as well. The invention is advantageous in that it reduces the overall number of accumulator read and write ports, thus reducing chip area needed for the accumulator data paths and allowing for utilization of a faster clock speed.

Having thus described a particular embodiment of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. A processor comprising:

a data processing unit;

an accumulator comprising a plurality of storage locations and having a first and second read ports for communication of data from said accumulator to said data processing unit;

said first and second ports also being coupled to a memory; and an instruction decoder for determining, responsive to an instruction being executed, which of said ports are not used by said instruction to communicate with said data processing unit.

2. A processor as set forth in claim 1 wherein said first and second ports are coupled to said memory through a memory bus.

3. A processor as set forth in claim 1 wherein said processor has an instruction set including at least one instruction that calls for reading the contents of a first one of said accumulator storage locations to an input of said processing unit and reading the contents of a second one of said accumulator storage locations to said memory and wherein said instruction decoder further controls said accumulator to output data from said second accumulator storage location to said memory using a one of said read ports that is not being used to communicate with said data processing unit.

4. A processor as set forth in claim 3 wherein said instruction set including at least one instruction that calls for coupling first and second operands stored in separate storage locations in said accumulator to be read to said processing unit and wherein said instruction decoder further determines which read ports are available for reading said second operand to said data processing unit and controls said accumulator to couple said accumulator storage location containing said second operand to a one of said ports that is not being used to read out said first operand to said data processing unit.

5. A processor as set forth in claim 3 wherein said processor is a digital signal processor.

6. A processor as set forth in claim 4 wherein said data processing unit comprises at least first and second data processing units and wherein a first subset of said ports are coupled to said first data processing unit and a second subset of said ports are coupled to said second data processing unit and at least one of said ports in said first subset is coupled to said memory and at least one of said ports in said second subset is coupled to said memory.

7. A processor as set forth in claim 1 wherein said processor has an instruction set including at least one instruction that calls for coupling the contents of a first one of said accumulator storage locations to said processing unit and coupling the contents of a second one of said accumulator storage locations to said memory and wherein said instruction decoder further controls said accumulator to couple said second accumulator storage location to a one of said ports that is not being used to communicate with said data processing unit.

8. A digital signal processor core comprising:

first and second data processing units;

an accumulator comprising a plurality of registers and having a plurality of write ports and first and second read ports;

at least a first one of said write ports coupled to receive data from said first data processing unit and at least a second one of said write ports coupled to receive data from said second data processing unit;

said first read port coupled to read data to said first data processing unit and said second read port coupled to read data to said second data processing unit;

said first and second read ports further being coupled to a memory; and an instruction decoder for determining, responsive to an instruction being executed, which of said read ports are not used by said instruction to communicate with said data processing unit.

9. A processor as set forth in claim 8 wherein said processor has an instruction set including at least one instruction that calls for reading the contents of a first one of said accumulator registers to one of said processing units and reading the contents of a second one of said accumulator registers to said memory and wherein said instruction decoder controls said accumulator to couple said second accumulator storage location to a one of said read ports that is not being used to communicate with said data processing unit.

10. A processor as set forth in claim 9 wherein at least one of said first and second ports is coupled to said memory through a memory bus.

11. A processor as set forth in claim 9 wherein each read port is coupled to a different input of said first and second data processing units.

12. A method of processing data in a processor comprising the steps of:

generating data in a data processing unit;

providing said generated data to an accumulator via a plurality of write ports associated with said accumulator, said accumulator comprising a plurality of storage locations for storing said data;

providing data from said accumulator to said data processing unit via a plurality of read ports associated with said accumulator from which said data processing unit can generate generated data;

wherein a plurality of said read ports also are coupled to a memory; and decoding instructions provided to said processor to determine which of said read ports are not used by said instruction to communicate with said data processing unit; and controlling said accumulator to use at least one of said read ports which are not used by said instruction to communicate with said data processing unit to communicate with said memory, if said instruction calls for such communication.

13. A method as set forth in claim 12 wherein each of said plurality of ports coupled to said memory is coupled to said memory through a memory bus.

14. A method as set forth in claim 13 wherein said plurality of ports coupled to said memory bus are read ports that are also coupled between said accumulator and an input of said data processing unit.

15. A method as set forth in claim 14 wherein said processor has an instruction set including at least one instruction that calls for reading the contents of a first one of said accumulator storage locations to an input of said processing unit and reading the contents of a second one of said accumulator storage locations to said memory bus and wherein said step of controlling said processor comprises controlling said accumulator to couple said second accumulator storage location to a one of said read ports that is not being used to communicate with said data processing unit.

16. A processor as set forth in claim 12 wherein said processor has an instruction set including at least one instruction that calls for coupling the contents of a first one of said accumulator storage locations to said processing unit and coupling the contents of a second one of said accumulator storage locations to said memory and wherein said controlling step comprises controlling said accumulator to couple said second accumulator storage location to a one of said ports that is not being used to communicate with said data processing unit.

17. A processor as set forth in claim 16 wherein said instruction set includes at least one instruction that calls for first and second operands stored in separate storage locations in said accumulator to be read to said processing unit wherein;

said decoding step further comprises determining which ports are available for reading said second operand to said data processing unit; and said controlling step further comprises controlling said accumulator to couple said accumulator storage location containing said second operand to a one of said ports that is not being used to communicate with said data processing unit.

\* \* \* \* \*